United States Patent

[11] 3,549,953

| | | |
|---|---|---|
| [72] | Inventor | Thomas C. Stitt<br>424 17th St., Barnesboro, Pa. 15714 |
| [21] | Appl. No. | 797,170 |
| [22] | Filed | Feb. 6, 1969 |
| [45] | Patented | Dec. 22, 1970 |

[54] REMOTE CONTROL RESET SYSTEM FOR USE WITH A GROUND MONITOR CIRCUIT
9 Claims, 2 Drawing Figs.

[52] U.S. Cl.................................................. 317/139,
307/140; 317/9, 317/140
[51] Int. Cl....................................................... H01h 71/68
[50] Field of Search............................................. 317/18, 45,
54.1, 140, 134; 307/132, 140; 200/61.69; 367/139

[56] References Cited
UNITED STATES PATENTS
2,452,051  10/1948  Hersey........................ 177/353
2,676,313  4/1954  Dehn............................ 340/168
3,196,316  7/1965  Crom............................ 317/18

Primary Examiner—William M. Shoop, Jr.
Assistant Examiner—H. E. Moose, Jr.
Attorney—Jackson, Jackson and Chovanes ABSTRACT: A remote control system particularly suitable for mine use, desirably operating on the ground monitor circuit. A single interruption of the ground monitor circuit can open a circuit breaker and a predetermined number of interruptions within a limited time can close the circuit breaker. Each interruption of the circuit energizes a step relay, and each step relay except the last as it is energized locks itself in and closes setup contacts permitting energizing the next step relay.

INVENTOR
Thomas C. Stitt

REMOTE CONTROL RESET SYSTEM FOR USE WITH A GROUND MONITOR CIRCUIT

DISCLOSURE OF INVENTION

The present invention relates to a remote control electrical system, particularly suitable for use in mine power systems.

A purpose of the invention is to permit remote control action, such as opening or closing of a circuit breaker, by interrupting a ground monitor circuit in a mine power system.

A further purpose is to close a circuit breaker by a predetermined number of circuit interruptions within a limited period of time.

A further purpose is to provide contacts on a ground check relay or auxiliary ground check relay in the ground monitor circuit which contacts will successively energize a master relay or set of master relays which in turn energize relays in successive steps, each of the successive step relays except the last, when energized, locking itself in and closing setup contacts which permit a relay in the next step to energize.

A further purpose is to provide a very simple remote control system which will operate in a mine power system without providing additional conductors in the mine power cable, and without interfering with the normal protective relays.

Further purposes appear in the specifications and in the claims.

In the drawings I have chosen to illustrate one only of the numerous embodiments in which the invention my invention may appear, selecting the forms shown from the standpoints of convenience in illustration, satisfactory operation, and clear demonstration of the principles involved.

A mine such as a bituminous coal mine is likely to have very heavy power requirements for operation of mining machines and conveyors. These are conveniently met by a high-voltage polyphase alternating current distribution system conveniently at 13,000 volts, three phase. In a section switch house a circuit breaker is located. The section switch house distributes power through high-voltage electric cables to a section load center adjacent to a point of utilization. The distance between the section switch house and the section load center may be considerable, often a mile or more, and if it is desired to manipulate the circuit breaker, except by its automatic opening in the case of a fault, considerable delay in operation may result.

By the present invention it is possible to open or close the circuit breaker, or perform other remote operations from the section load center or other desired remote point, using the existing ground monitor circuit without addition of conductors in the electric power cables.

The ground monitor circuit is normally used to check on the integrity of the ground. Using the features added by the present invention, it is possible to remotely open the circuit breaker by breaking the ground monitor circuit at a switch provided for the purpose, and it is possible to close the circuit breaker by opening and closing the ground monitor circuit eight times by this switch within a predetermined short time, for example, 10 seconds.

This is accomplished without interference with the normal protective relays or provision of other additional circuitry except for a bank of relays to be described.

In normal operation of a mine power system, couplers of high-voltage cables must be opened and closed from time to time and this will of course cause interruptions in the ground monitor circuit. For example, if a coupler is opened, and closed, and then opened, this will cause three makes and breaks of the ground monitor circuit. In the present invention the predetermined number of makes and breaks to close the circuit breaker is conveniently set at eight, although another number may be used, because it has been found that this combination of makes and breaks is very unlikely to occur accidentally in a time of 10 seconds. Furthermore, after eight makes and breaks have occurred in 10 seconds, the preexisting condition of the circuit after the eight makes and breaks must last for an additional 5 seconds in the preferred embodiment in order to close the circuit breaker and this is unlikely to occur unless intended.

Of course, it will be evident that the circuit can be designed to require a different number of makes and breaks, for example, 10 or 12 or some other number, in a different period of time if desired.

In the circuits, timing relay contacts are shown in the condition prior to timing out of the timing relay. Other relay contacts are shown in the deenergized condition.

Figure 1:
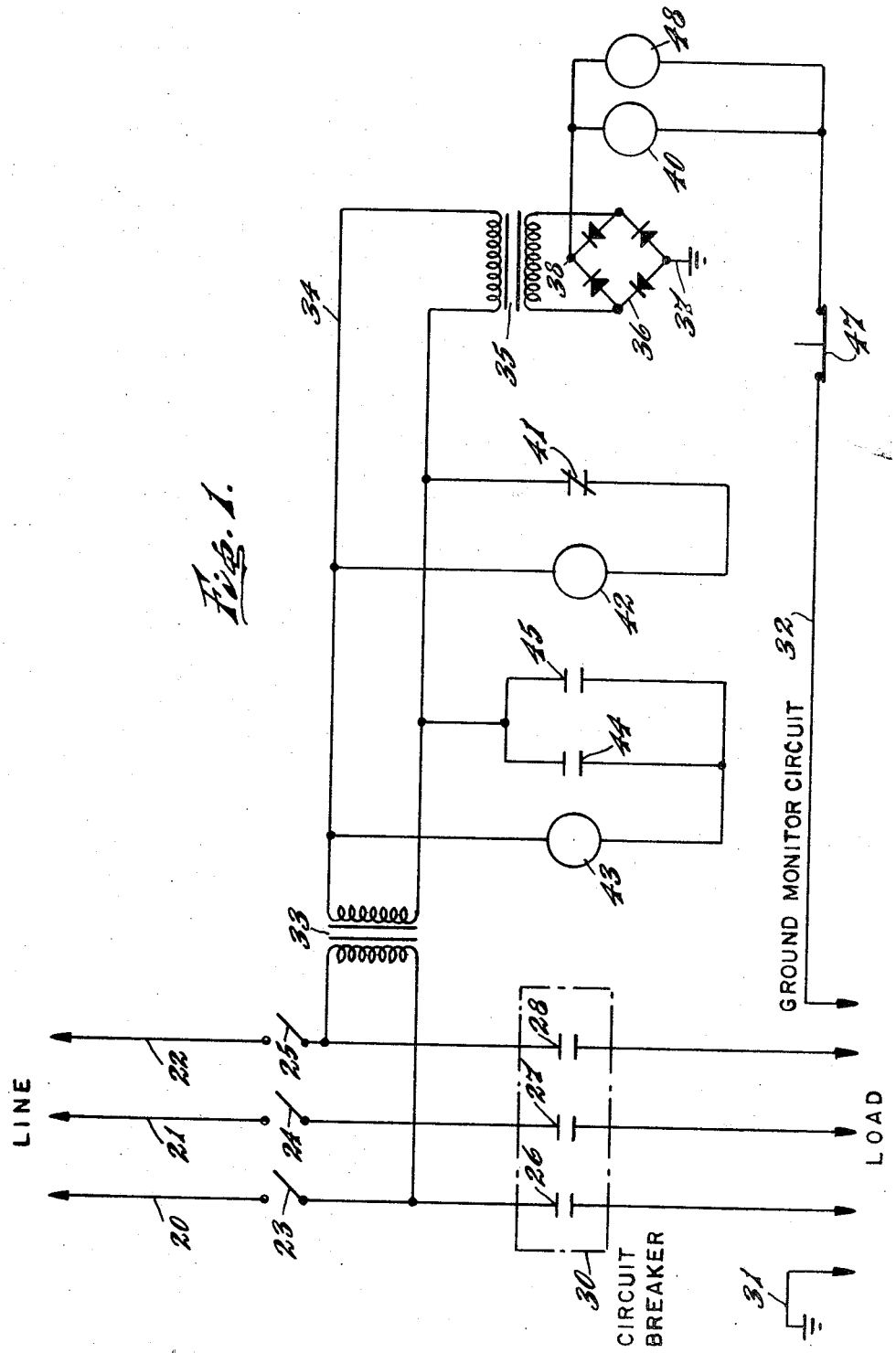
FIG. 1 is a circuit diagram showing a power line, a ground monitor circuit and a circuit and a circuit breaker, which latter may be located in a section switch house in a high-voltage underground distribution system for a mine, for example, a bituminous coal mine or other mine.

Referring to FIG. 1, power lines 20, 21 and 22 of a three-phase high-voltage power system pass through disconnect switches 23, 24 and 25 and through the contacts 26, 27 and 28 of a circuit breaker 30 to the load. The system is conveniently star connected, and has a ground wire 31. Also in the same cable in which the power lines and the go ground wire are contained, there is a ground monitor wire 32, which is normally intended as a means of testing whether the continuity of the ground wire is interrupted as a by a fall of rock. The ground monitor wire 32 is energized by a transformer 33 connected across one of the phases, stepping down the voltage for a circuit breaker operating circuit 34 which has a transformer 35 connected to a full wave rectifier 36 grounded at 37 and having a connection 38 providing 125 volts direct current to the ground monitor wire 32. In the ground monitor circuit is provided a ground check relay, as well known, at 40 which has normally closed contacts 41 which when the ground check relay is deenergized actuates circuit breaker trip coil 42 in circuit 34.

The circuit breaker also has a closing coil 43 which is in series with normally open circuit breaker closing contacts 44. Contacts 44 are shunted by normally open output relay contacts 45 of output relay 46 to be described.

The ground monitor circuit 32 has a test switch or pushbutton 47 which is normally closed and spring biased to close, in series therewith and when the test switch 47 is pressed, the ground check relay 40 is deenergized and this closes contacts 41 and energizes the circuit breaker trip coil 42, opening the circuit breaker.

Rather than modify the ground check relay, I place in parallel with it in the ground monitor circuit 32 an auxiliary ground check relay 48 to be described.

Figure 2:
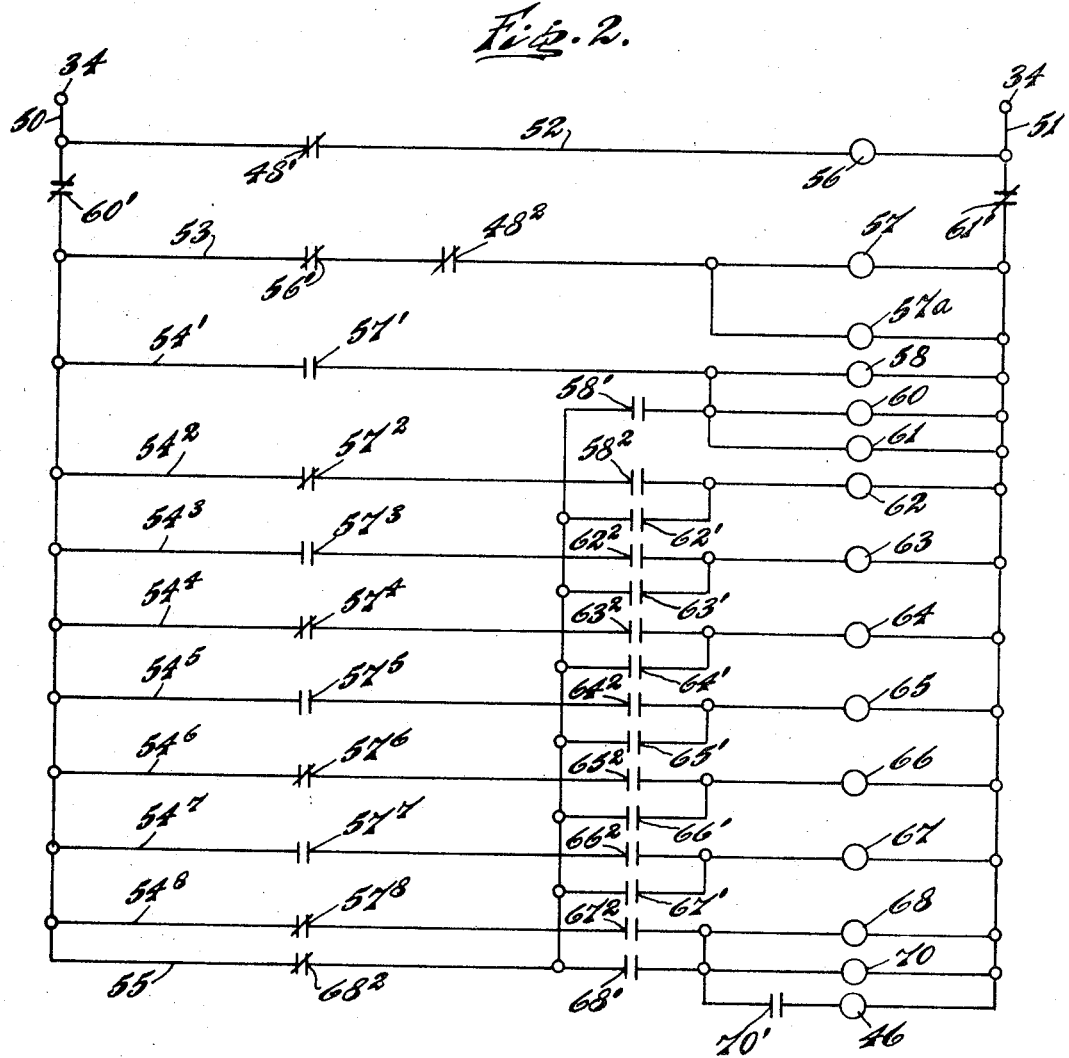
FIG. 2 is an electric circuit diagram showing a remote control relay circuit of the present invention.

In the section switch house or other convenient location I provide a remote control relay circuit as shown in FIG. 2, energized, for example, at 115 volts alternating current by the circuit breaker operating circuit 34 as shown in FIG. 1. Leads 50 and 51 are connected to the source of power, across which are connected a timer circuit 52, a master relay circuit 53, eight step relay circuits $54^1$ to $54^8$ inclusive, and a locking circuit 55.

Normally closed auxiliary ground check relay contacts $48^1$ are interposed in timer circuit 52 in series with a timer relay 56.

Master relay circuit 53 has in series normally closed contacts $56^1$ of timer relay 56, normally closed contacts $48^2$ of auxiliary ground check relay 48, and master relays 57 and 57a which are in parallel with one another. The master relays 57 and 57a are effectively one relay, it simply being more convenient to locate certain contacts on one of them and certain other contacts on another of them in order to employ less expensive relays.

First relay step circuit $54^1$ has a normally opened contact $57^1$ of master relay 57 in series with first step relay 58 which is in parallel with first cycle timing relay 60 and in parallel with second cycle timing relay 61.

When first step relay 58 is energized, it locks itself in by closing normally open contacts $58^1$ in locking circuit 55. It also sets up to energize the next step relay by closing normally open contacts $58^2$ in second step circuit $54^2$.

The purpose in having two cycle timing relays 60 and 61 is to guard against their failure to function. Relay 60 when it times out opens normally closed contacts $60^1$ which cuts off power from the step relays and the master relays at line 50, and timing relay 61 when it times out opens normally closed contacts $61^1$ which cuts off power from the master relays and the step relays at line 51.

Once first step relay 58 has been energized and has closed normally open setup contacts $58^2$ in the second step circuit $54^2$, the next closing of ground monitor switch 47 will energize auxiliary ground check relay 48 to deenergize master relay 57, will close its normally closed contact $57^2$ and energize second step relay 62, which when energized will lock itself in by closing normally open contacts $62^1$ in locking circuit 55 and will set up to energize the third step relay by closing normally open contacts of $62^2$ in third step circuit $54^3$.

The next time switch 47 opens, auxiliary ground check relay 48 is deenergized, master relay 57 is energized, it will close normally open contacts $57^3$ in third step circuit $54^3$ and this will energize third step relay 63. When relay 63 is energized its normally open locking contacts $63^1$ are closed, locking this relay in, and its normally open setup contacts $63^2$ in fourth step relay circuit $54^4$ are closed.

The next time switch 47 closes, auxiliary ground check relay 48 is energized, master 57 and $57^1$ are deenergized, and normally closed master relay contacts $57^4$ in series with normally open setup contacts $63^2$ in closed position energize fourth step relay 64. The energizing of fourth step relay 64 closes normally open locking-in contacts $64^1$ in locking-in circuit 55 and also closes normally open setup contacts $64^2$ in fifth step circuit $54^5$.

The next time switch 47 opens, auxiliary ground check red relay 48 is deenergized, master relays 57 and 57a are energized, normally open contacts $57^5$ on master relay 57a are closed, in series with closed setup contact $64^2$, to energize fifth step relay 65 in circuit $54^5$. This closes normally open locking-in contacts $65^1$ in locking circuit 55 and also closes normally open setup contacts $65^2$ in sixth step circuit $54^6$.

The next time switch 47 is closed, this energizes auxiliary ground check relay 47, deenergizes master relays 57 and 57a, closes normally closed contacts $57^6$ on master relay 57a, and they are in series with closed setup contacts $65^2$ and energize sixth step relay 66. Relay 66 when it is energized closes normally open locking contacts $66^1$ in locking circuit 55 to lock in relay 66, and also closes normally open setup contacts $66^2$ in seventh step circuit $54^7$.

The next time switch 47 is opened, this deenergizes auxiliary ground check relay 48, energizes master relay 57 and 57a, closing normally open contact $57^7$ on master relay 57a, in series with closed setup contacts $66^2$, and this energizes seventh step relay 67. The energizing of seventh step relay 67 closes normally open locking contact $67^1$ in locking circuit 55 and also closes normally open setup contacts $67^2$ in eighth step circuit $54^8$.

The next time switch 47 is closed, this energizes auxiliary ground check relay 48, deenergizing master relays 57 and 57a, closing normally closed contacts $57^8$ on master relay 57a in series with closed setup contacts $67^2$, and this energizes eighth step relays 68. Assuming that this is the last step in the sequence, when relay 68 is energized, normally open locking contacts $68^1$ are closed, causing the earlier step relays to remain locked in through closed setup contacts $67^2$ and master relay contacts $57^8$.

When eighth step relay 68 is energized, it also opens normally closed contacts $68^2$ which interrupt the former locking circuit 55 and prepare to unlock all the seven other step relays as soon as the eighth step relay 68 is deenergized.

It should be kept in mind that locking contacts $58^1$, $62^1$, $63^1$, $64^1$, $65^1$, $66^1$, and $67^1$ are all in parallel with one another but in series with contacts $68^2$, and when contacts $68^2$ open, they are in series with contacts $68^1$.

In parallel with eighth step relay 68 and in series with master relay contacts $57^8$ and setup contacts $67^2$ is an output timing relay 70 which has normally open contact $70^1$ in a separate parallel branch across eighth step relay 68, these contacts $70^1$ closing when output timing relay 70 times out. An output relay 46 is in series with output timing relay contacts 70 in this separate branch so that it can be energized when the output timing relay times out, and close output relay contacts 45 in FIG. 1, energizing the circuit breaker close coil 43 to close the circuit breaker 30.

It is important to keep in mind a relationship between the times at which the various timers time out.

Cycle timing relays 60 and 61 are in overall control of the operation and each is desirably set for a relatively short time, for example, 15 seconds. Either of them by timing out while an intermediate step in the relay sequence is in process will interrupt the step operation entirely. Output timing relay 70 is set to time out after a much shorter time, for example, 5 seconds, so that it provides an additional safeguard against the possibility of inadvertently closing the circuit breaker by jiggling the cable coupling. Thus, in order to close the circuit breaker, four openings and four closings or eight makes or breaks of the ground monitor circuit must take place within 10 seconds, and the master relays 57 and 57a must not change their energization during 5 seconds thereafter.

Timing relay 56 is set for an extended period, for example, a minute. It only times out when the ground monitor circuit is interrupted for an extended period of time. It times out if the auxiliary ground check relay contacts $48^1$ are closed continuously for more than a minute and thus prevents the device from recycling master relays 57 and 57a, first step relay 58 and cycle timing relays 60 and 61 on and off every 15 seconds during an extended interruption of the ground monitor circuit.

In operation, depressing test switch 47 in the ground monitor circuit once energizes the circuit breaker trip coil 42 and trips the circuit breaker. If within 10 seconds from the first depression of the switch 47, action is not taken to accomplish four makes and three more breaks of the ground monitor circuit within 10 seconds, the circuit breaker simply remains open.

On the other hand, if test switch 47 in is manually opened and closed four times and not more than four times within 10 seconds, then the remote control relay system operates to energize circuit breaker closing coil 43 and close circuit breaker 30 by remote control as follows:

The first interruption of the ground monitor circuit against the action of the spring in switch 47 deenergizes auxiliary ground check relay 48, starting the second timing relay 56 and energizing master relays 57 and 57a. In the first relay step circuit $54^1$ this energizes first step relay 58 and cycle timing relays 60 and 61. These relays are locked in, and setup contact $58^2$ is closed in second relay step circuit $54^2$.

When switch 47 next closes, auxiliary ground check relay 48 is energized and this deenergizes master relays 57 and 57a, closes normally closed contacts $57^2$, and through setup contacts $58^2$ then energizes second step relay 62, which locks itself in and closes the setup contacts in the circuit for the next step.

The next time switch 47 is opened, auxiliary ground check relay 48 is deenergized and this energizes master relays 57 and 57a to close master relay contacts $57^3$ in the third step relay circuit $54^3$ in series with setup contacts $62^2$ to energize third step relay 63, which locks itself in and closes the setup contacts in the next step circuit.

The next time test switch 47 closes this energizes auxiliary ground check relay 48 which deenergizes master relays 57 and 57a to energize fourth step relay 64 in series with master relay contacts $57^4$ and setup contacts $63^2$.

When switch 47 next opens, this deenergizes auxiliary ground check relay 48, which energizes master relays 57 and 57a to energize fifth step relay 65 through normally open master relay contacts $57^5$ and setup contacts $64^2$.

The next time switch 47 closes, this energizes auxiliary ground check relay 48, to deenergize master relays 57 and 57a and energize sixth step relay 66 through normally open master relay contacts 57$^6$ and setup contacts 65$^2$.

The next time switch 47 is opened, this deenergizes auxiliary ground check relay 48 and energizes master relays 57 and 57a to close master relay contacts 57$^7$ in series with setup contacts 66$^2$ which are now closed, and thus to energize seventh step relay 67.

If the switch 47 is now closed for the fourth time, all within the required 10 seconds, it energizes auxiliary ground check relay 48 to deenergize master relays 57 and 57a, closing normally closed master relay contacts 57$^8$ in series with setup contacts 67$^2$ to energize eighth step relay 68. This closes locking contacts 68$^1$ and opens locking circuit contacts 68$^2$. This also starts output timing relay 70. In case there is enough time for output timing relay 70 to time out before cycle timing relay 60 and 61 time out, output relay 46 is energized and closes circuit breaker 30. If, however, cycle timing relays 60 and 61 time out before output timing relay 70 times out, then no operation occurs.

If after four openings and closings of test switch 47 within the required time of 10 seconds, switch 47 is opened for a fifth time, auxiliary ground check relay 48 is deenergized, closing contact 48$^2$ and energizing master relays 57 and 57a. Normally closed master relay contacts 57$^8$ then are opened, deenergizing eight step relay 68, breaking its normally open contacts 68$^1$ which have been performing the locking-in function after contacts 68$^2$ were opened, thus unlocking all of the step relays in the system. The first step relay will again be energized and the cycle will start over again.

If the four openings and closing of test switch 47 do not take place within the period of 10 seconds or the additional waiting time of 5 seconds is not permitted, then output relay 46 is not energized. After 15 seconds, cycle timing relays 60 and 61 will time out, opening both sides of the remote control relay circuit, and if 5 seconds is not allowed for output timing relay 70, output relay 46 is not energized.

If test switch 47 is only opened and closed three times, this will be insufficient to energize the last step relay and no remote control action will take place other than the opening of the circuit breaker which takes place during the first step.

If the ground monitor circuit is interrupted for an extended period of time, then second timing relay 56 will time out, suitably after a minute, and all operation of the remote control system will cease until test switch 47 is again closed and opened, in which case second timing relay 56 starts timing again.

In view of my invention and disclosure, variations and modifications to meet individual whim or particular need will doubtless become evident to to others skilled in the art to obtain all or part of the benefits of my invention without copying the structure shown, and I, therefore, claim all such insofar as they fall within the reasonable spirit and scope of my claims.

I claim:

1. In a remote control system, a remote control circuit, a remote control relay circuit, means in the remote control circuit for making and breaking the same and for correspondingly making and breaking the remote control relay circuit, master relay means in the remote control relay circuit in series with the means for making and breaking the remote control relay circuit, first step relay means in the remote control relay circuit, there being contacts on the master relay means in series with the first step relay means for energizing the first step relay means, locking circuit means in the remote control relay circuit, there being locking contacts on the first step relay means for completing the locking circuit means to the first step relay means when it is energized, cycle timing relay means operatively connected to be energized when the first step relay means is first energized, in series with its locking contacts, for determining the total elapsed time within which the cycle must be completed, there being timing contacts on the cycle timing relay means for breaking the remote control relay circuit when the cycle timing relay means times out, at least one intermediate step relay means in the remote control relay circuit, there being contacts on the master relay means for energizing each intermediate step relay means on the next energizing or deenergizing of the master relay means after the relay means in the preceding step has been energized, and there being setup contacts for the next step relay means on the relay means for each intermediate step, said setup contacts being in series with the contacts of the master relay means which energize the relay means in each step, there being on each intermediate step relay means locking contacts for completing the locking circuit means to that intermediate step relay means when it is energized, last step relay means in the remote control relay circuit, there being contacts on the master relay means for energizing the last step relay means on the next energizing or deenergizing of the master relay means after the relay means in the preceding step has been energized, said last step relay means having contacts for breaking the locking of all of the other relay means above mentioned (except the master relay means), and output means energized by the last step relay means.

2. A remote control system of claim 1, in which the means in the remote control circuit for making and breaking the same and for correspondingly making and breaking the remote control relay circuit comprises switch means in the remote control circuit, and relay means in the remote control circuit having contacts in series with the master relay means in the remote control relay circuit.

3. A remote control system of claim 1, in combination with second timing relay means in the remote control relay circuit, means for energizing the second timing relay means when the remote control circuit is interrupted, and means for deenergizing the master relay means when the second timing relay means times out, the second timing relay means being set for a longer time than the cycle timing relay means.

4. A remote control system of claim 1, in which the output means comprises output timing relay means which is energized when the last step relay means is energized, said output timing relay means being set for a shorter time than the cycle timing relay means, and output relay means operatively connected to the remote control relay circuit, there being normally open contacts on the output timing relay means in series with the output relay means.

5. A remote control system of claim 1, having a total of eight steps in the remote control relay circuit.

6. In an electric power system for a mine, power lines including a ground monitor circuit, a circuit breaker adapted to open and close the power lines and including a circuit breaker closing coil and a circuit breaker open coil operatively connected to the ground monitor circuit, a test switch in the ground monitor circuit, ground check relay means in the ground monitor circuit responsive to operation of the test switch, a remote control relay circuit, a master relay means in the remote control relay circuit, there being contacts on the ground check relay means for energizing and deenergizing the master relay means in response to deenergizing and energizing of the ground check relay means, a plurality of successive step relay means in the remote control relay circuit, there being contacts on the master relay means in series with each successive step relay means for energizing each successive step relay means on the next energizing or deenergizing of the master relay means after the relay means in the preceding step has been energized, locking means including contacts on each successive step relay means except the last for locking in each particular successive step relay means when it is energized, there being set up contacts for the next successive step relay means on each successive step relay means except the last, said setup contacts being in series with the contacts of the master relay means which energize the successive step relay means in each step, cycle timing relay means energized and locked in when the first successive step relay means is first energized and locked in, for determining the total elapsed time within which the cycle must be completed, there being timing contacts on the cycle timing relay means for breaking the remote control circuit when the cycle timing relay means times out, output relay means energized when the last successive step relay means is energized, said last successive step relay means having contacts for unlocking all preceding successive step relay means, the output relay means having contacts in the ground monitor circuit for energizing said circuit breaker closing coil, and the ground check relay means having contacts in the ground monitor circuit for energizing the circuit breaker trip coil, the circuit breaker trip coil being deenergized when the circuit breaker closing coil is energized.

7. A mine electric power system of claim 6, in combination with output timing relay means which is energized when the last successive step relay means is energized, said output timing relay means being set for a shorter time than the cycle timing relay means, there being contacts on said output timing relay means for energizing said output relay means when the output timing relay means times out.

8. A mine electric power system of claim 6, in combination with second timing relay means in the remote control relay circuit, there being contacts on said ground check relay means for energizing said second timing relay means when the ground monitor circuit is interrupted, said second timing relay means having contacts for deenergizing the master relay means when the second timing relay means times out, said second timing relay means being set for a longer time than the cycle timing relay means.

9. A mine electric power system of claim 6, having a total of eight successive steps.